United States Patent
Blandy (12)

(10) Patent No.: US 6,295,642 B1
(45) Date of Patent: Sep. 25, 2001

(54) METHOD AND APPARATUS FOR PARTIAL JUST IN TIME COMPILING IN A DATA PROCESSING SYSTEM

(75) Inventor: Geoffrey Owen Blandy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,106

(22) Filed: Apr. 29, 1999

(51) Int. Cl.$^7$ ....................................................... G06F 9/45
(52) U.S. Cl. ......................................... 717/8; 717/8; 717/9
(58) Field of Search ................................... 717/4, 5, 6, 7, 717/8, 9; 712/233, 234, 235, 236, 239; 714/35, 37, 38

(56) References Cited

U.S. PATENT DOCUMENTS

| | | | |
|---|---|---|---|
| 5,768,593 | * | 6/1998 | Walters et al. ............................ 717/5 |
| 5,848,274 | * | 12/1998 | Hamby et al. ............................ 717/5 |
| 6,139,199 | * | 10/1999 | Rodriguez ................................ 717/9 |
| 6,170,083 | * | 1/2001 | Adl-Tabatabai ......................... 717/9 |

OTHER PUBLICATIONS

Franz et al., "Slim binaries", Comm. of the ACM, ACM, Dec. 1997, pp. 87–94.*

Thompson, "Java on 1A–64", Performance Computing, Oct. 1998, pp. 41–47.*

Liband, "Compiler analysis,:Critical step for optimizing embedded code", Electronic Engineering times, Apr. 5, 1999, pp. 88–98.*

Hsieh et al., "A study of the cache and branch performance issues with running Java on current hardware platforms", IEEE, 1997, pp. 211–216.*

Lambright, "Java bytecode optimizations", IEEE, 1997, pp. 206–210.*

Ciernak et al., "Briki: An optimizing Java compiler", IEEE, 1997, pp. 179–184.*

Krall, "Efficient Java VM Just–in–Time compilation", IEEE, 1998, pp. 205–212.*

* cited by examiner

Primary Examiner—Kakali Chaki
(74) Attorney, Agent, or Firm—Duke W. Yee; Jeffrey S. LaBaw

(57) ABSTRACT

A method and apparatus for just in time compilation of Java bytecode methods and provides a means to compile only the paths that are actually executed. An iterative process is employed whereby bytecodes are compiled up to the next conditional flow bytecode or return, the compiled code is executed and any attempt to enter uncompiled paths of the method is monitored. When the executing thread attempts to execute an uncompiled path control is returned to the compiler and the process is repeated starting with the first bytecode of that path. The process continues until all paths have been compiled or until it is deemed likely that all the most commonly executed paths have been compiled. At that point final optimizations and housekeeping are performed.

39 Claims, 4 Drawing Sheets

METHOD AND APPARATUS FOR PARTIAL JUST IN TIME COMPILING IN A DATA PROCESSING SYSTEM

BACKGROUND OF THE INVENTION

1. Technical Field

The present invention relates generally to an improved data processing system and in particular to a method and apparatus for processing instructions in a data processing system. Still more particularly, the present invention relates to a method and apparatus for partially Just In Time compiling instructions in a data processing system.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are nonspecific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

When extra speed in executing a Java program is needed, a Just In Time (JIT) compiler may be used to translate bytecodes for a method or class into native machine instructions before executing them. Typically, this compilation only occurs once per method. Some JIT compilers may compile entire classes, rather than one method at a time.

Just In Time compilation of Java methods may provide significant performance boosts to Java programs. This benefit, however, comes at the cost of increased storage utilization and significant compile time.

Therefore, it would be advantageous to have an improved method and apparatus for Just In Time compiling, also referred to as JITing, of Java methods that would reduce the storage use and compile time.

SUMMARY OF THE INVENTION

The present invention provides a method and apparatus for just in time compilation of Java bytecode methods and provides a means to compile only the paths that are actually executed. An iterative process is employed whereby bytecodes are compiled up to the next conditional flow bytecode or return, the compiled code is executed and any attempt to enter uncompiled paths of the method is monitored. When an attempt is made to execute an uncompiled path control is returned to the compiler and the process is repeated starting with the first bytecode of that path. The process continues until all paths have been compiled or until it is deemed likely that all of the most commonly executed paths have been compiled. At that point, final optimizations and housekeeping are performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
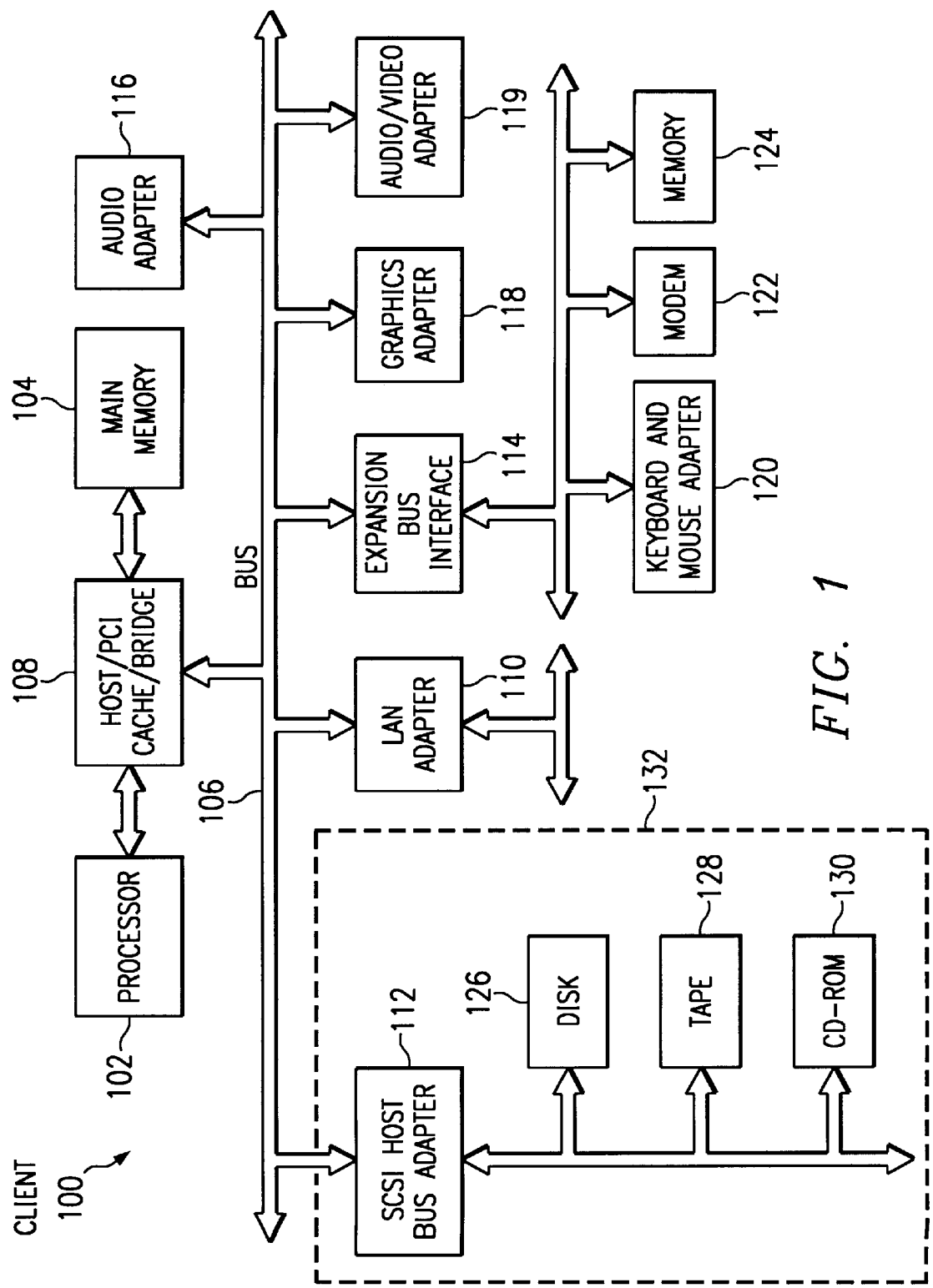
FIG. 1 is a block diagram illustrating a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide nonvolatile memory for storing operating system files and/or user-generated data.

The depicted example in FIG. 1 and above-described examples are not meant to imply architectural limitations.

The present invention provides a method, apparatus, and instructions used to reduce storage utilization and reduce compile time for Java methods. The present invention also may be applied to other types of interpretive languages. The mechanism of the present invention involves Just In Time compiling, also referred to as "JITing", only those paths of a method that are actually executed.

Figure 2:
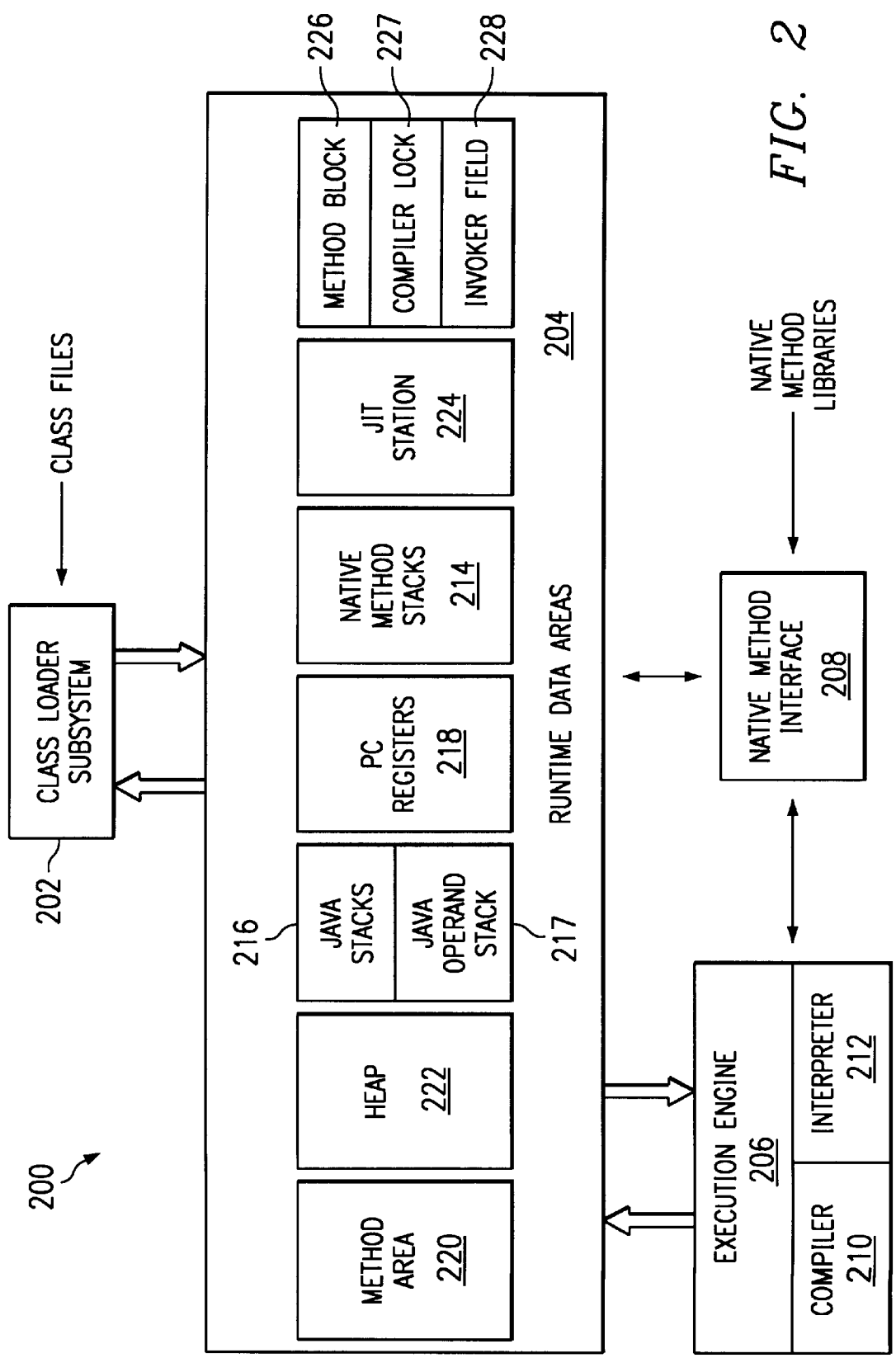
FIG. 2 is a block diagram of a Java virtual machine depicted in accordance with a preferred embodiment of the present invention.

With reference now to FIG. 2, a block diagram of a Java virtual machine is depicted in accordance with a preferred embodiment of the present invention. Java virtual machine (JVM) 200 includes a class loader subsystem 202, which is a mechanism for loading types, such as classes and interfaces, given fully qualified names. JVM 200 also includes run time data areas 204, execution engine 206, and native method interface 208.

Execution engine 206 is a mechanism for executing instructions containing any method of classes loaded by class loader subsystem 202. In the depicted example, execution engine 206 includes a Just In Time compiler 210 and an interpreter 212. Bytecodes make up a method and are a sequence of instructions for JVM 200. Each instruction consists of a 1-byte opcode followed by zero or more fixed operands. The opcode indicates the operation to be performed. Variable operands and data appear on the Java operand stack 217 which appears within the Java stack 216. Interpreter 212 will cause the execution of the necessary code or instructions in response to this bytecode.

Compiler 210 is a Just In Time compiler in which the bytecodes of a method are normally compiled to native machine code the first time the method is invoked after it has been selected as a candidate for compilation. Selection may be based on a method's former CPU consumption, number of invokes or some other criteria or it is possible that all methods may be selected for compilation without regard to criteria. The native machine code for the method is then cached or stored in a buffer, so the code can be reused the next time the same method is invoked. In the depicted examples, the mechanism of the present invention allows for partial just in time compiling or JITing of the method.

Native method interface 208 is used as an interface to allow a Java program to interact with the host by invoking native methods. Native methods are typically stored in a dynamic link library. An example of a particular native method interface is a Java native interface (JNI). In essence, native method interface 208 allows access to resources in the underlying operating system.

Run time data areas 204 includes native method stacks 214, Java stacks 216, PC registers 218, method area 220, heap 222, and JIT station 224. Run time data areas 204 also contains method block 226. These different data areas represent the organization of memory needed by JVM 200 to execute a program. Native method stacks 214 stores the state of invocations of native methods. Java stacks 216 are used to store the state of Java method invocations while PC registers 218 are used to indicate the next instruction to be executed. Method area 220 contains class data while heap 222 contains all instantiated objects. JIT station 224 is used to store all information needed for compilation of the method such as flow control information, register assignments, virtual operand stack content. The JIT station may be located as a single contiguous area of memory or may be multiple noncontiguous areas of memory and may be dynamically allocated or reusable.

Method block 226 contains the compiler lock 227 which is used to serialize compilation of the method. This lock must be held whenever compilation is performed for a method including initialization and finalization. This maintains the integrity of JIT station data and ensures that the same path is not compiled by multiple threads. However, the lock is not held while the compiled code is being executed, even when the method is only partially compiled. This provides for improved performance by obviating the need to acquire/release the lock during method invocation. It also allows multiple threads to concurrently run the compiled code.

When a method is selected as a candidate for compilation, the invoker field 228 of method block 226 is set to point to the JIT initialization code. In this way, control is passed to the JIT when the method is next invoked. Upon receiving control, the JIT attempts to acquire the compiler lock for the method. If the lock is unavailable (indicating another thread is compiling the method), control is passed to the interpreter to execute the method. Otherwise, following housekeeping and any initial passes, the compilation process commences with the first bytecode of the method. The bytecodes are compiled up to and including the first/next conditional flow bytecode (if/switch) or return. The depicted example actually identifies the bytecodes to be compiled and then compiles the bytecodes. Of course, the bytecodes could be compiled as they are encountered, depending on the implementation.

While most bytecodes can be compiled in an implementation dependent manner, flow control bytecodes must be handled specially as they may cause flow to pass to what is yet uncompiled code. Branch monitors must be used to insure control is returned to the compiler when an attempt is made to enter an uncompiled path. Branch monitors may be implemented using hardware or software breakpoints with appropriate interrupt handlers or more practically using branch instructions coupled with information logged in the JIT station. For example on an X86 platform the following code could serve as branch and fallthru monitors for the Java bytecode ifeq:

800 test eax, eax
801 jeq taken_monitor_handler1
802 jmp fallthru_monitor_handler1
803 unused Here eax is assumed to hold the top of stack value upon entry to the code segment. The code at taken_monitor_handler1 would merely push a 1 onto the stack to indicate which monitor had been hit and pass control to the common taken monitor handler. Similar code would be found at fallthru_monitor_handler1. The JIT station would contain a branch monitor table where entry 1 would represent these branch monitors and contain such information as the fallthru and target bytecode addresses, indication of which monitors are active and the address of the native code that comprises the branch monitor.

When the code is executed, control is passed to either the fallthru or the taken branch monitor handler. For the fallthru case, the corresponding branch monitor entry would be updated to indicate the fallthru monitor is no longer active, location 802 would become the new target address for depositing native code and the fallthru bytecode would become the current bytecode. The first instruction(s) of the newly compiled path would then overlay the jmp instruction at location 802. If the taken case were the first hit, the fallthru branch monitor would be converted to a taken branch monitor by moving the fallthru bytecode address of the entry to the taken address, the entry would be updated to indicate that the fallthru monitor is no longer active, location 802 would become the new target address for depositing native code, the target bytecode would become current and the jeq at 801 would be converted to:

801 jne taken_monitor_handler1

Again, the first instruction(s) of the newly compiled path would then overlay the jmp instruction at location 802. Note that whichever path is taken first is treated as the fallthru path and the resulting code is emitted immediately following the conditional branch thereby improving I cache efficiency. If the branch at 801 is subsequently taken, an unused location in the compile buffer would be allocated and become the target of the branch. Compilation would continue using the fallthru address as the current bytecode and the compiled code would be deposited at the newly allocated buffer address.

Another bytecode that requires special treatment is goto. The Java compiler most commonly uses gotos to implement if else constructions and to enter for loops. While it is possible to "fold out" gotos by rearranging the code, the resultant code may be less efficient for certain native architectures. Specifically, an extra branch instruction may be required at the end of a for loop. In accordance with a preferred embodiment of the present invention, when a bytecode range is selected for compilation it never includes gotos that target uncompiled code outside the selected range. This is accomplished by extending the selected range to ensure all such targets are included and could result in the selection of the entire method. From a practical standpoint, this allows loops to be compiled in an efficient manner and rarely causes the inclusion of code that is not part of the current path.

The final class of bytecodes requiring special treatment are the returns. If a return is encountered and the method has one or more untaken branches, a return monitor is inserted into the native code. The return monitor provides for finalization (see below) of a method after it has been invoked sufficiently often to determine that any untaken branches are not likely to initiate commonly executed paths. The return monitor decrements a counter and performs a normal return if the counter is non-zero. When the counter goes to zero the method is finalized. The counter may be initialized at compilation startup and may be a fixed constant or may be a function of the number of conditional flow control instructions. Alternatively, the counter could be incremented by some value each time a branch monitor is added. The idea is to allow the method sufficient invocations to give all paths a fair chance to be executed because once the method is finalized all uncompiled paths will be interpreted.

Methods are finalized when the compilation process is deemed complete. The resources comprising the JIT station are released and final optimizations are performed. The native code may be relocated from a temporary buffer in the JIT station to the final JIT buffer. Any untaken branches are converted to interpreter invocations for the uncompiled paths. Because the finalization process releases significant resources and typically improves the performance of native code, it is desirable to finalize methods as early as possible. However, premature finalization could leave significant paths uncompiled. Therefore, it is a goal of the current invention to provide a means to finalize a method as soon as the commonly executed paths are likely to have been compiled. Of course if all the paths of a method have been compiled, the method will be finalized immediately.

A time stamp may be used to force asynchronous finalization of methods that cease running or that infrequently or never exit. The time stamp can be set when a method is initialized for compilation or each time a path has been compiled and the method is about to be executed. Asynchronous finalization can be performed periodically or in response to requests for compiler resources. According to the preferred embodiment of this invention, all methods with expired time stamps will be finalized whenever a new JIT station is allocated.

Figure 3:
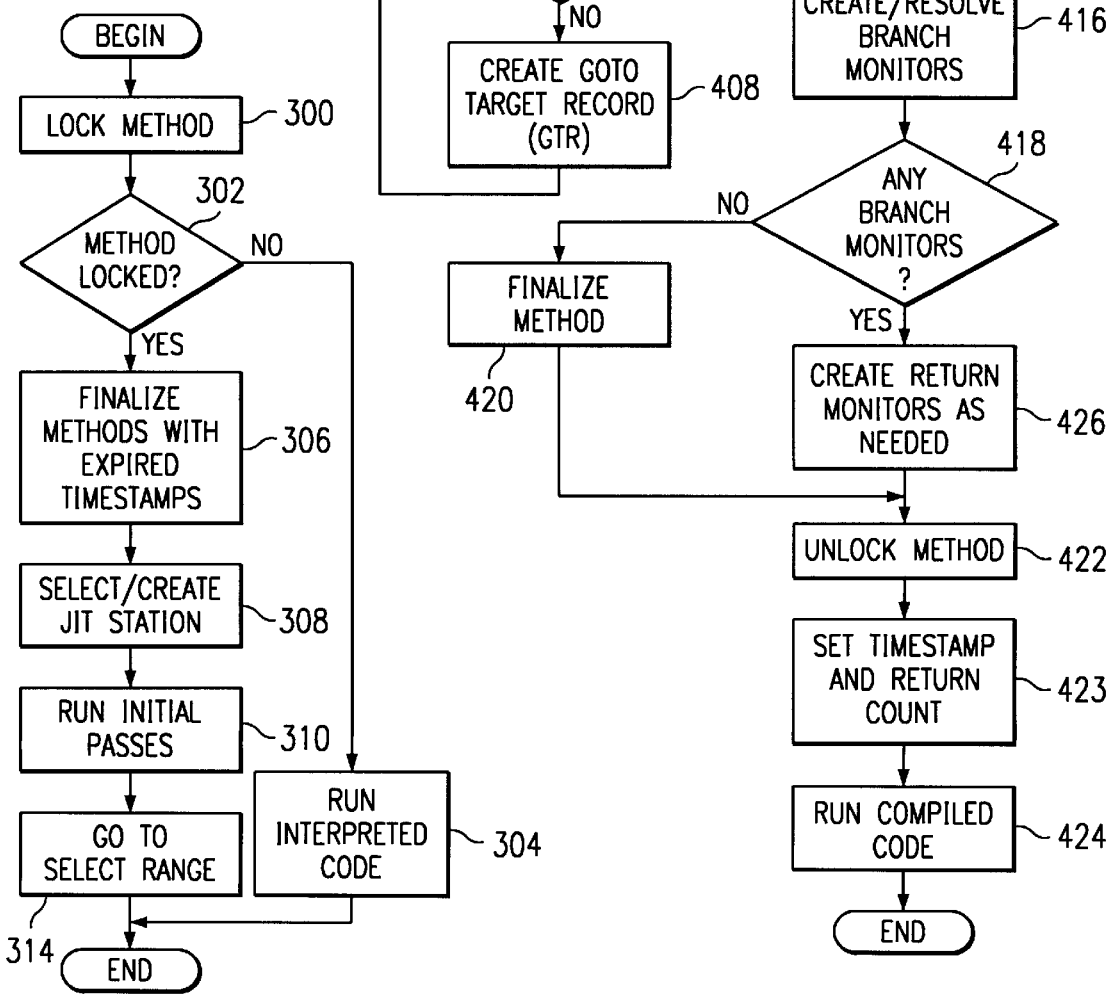
FIG. 3 is a process for Just In Time compiling a selected method depicted in accordance with a preferred embodiment of the present invention.

With reference now to FIG. 3, a process for Just In Time compiling a selected method is depicted in accordance with a preferred embodiment of the present invention. The process begins by attempting to lock the method that is to be JITed (step 300). In accordance with a preferred embodiment of the present invention, the method is locked when the initial compilation occurs. The lock then is released prior to executing the code. The method also is locked prior to resuming compilation via a branch monitor.

Thereafter, a determination is made as to whether the method has been locked (step 302). If the method has not been locked, the process then runs the interpreted code using an interpreter (step 304) with the process terminating thereafter.

With reference again to (step 302), if the method has been locked, then methods with expired time stamps are finalized (step 306). Next, a JIT station is created or selected for use in processing the method (step 308). A JIT station in this example is a storage partition that is used to store all of the needed information for compiling the method.

Thereafter, initial passes through the method may be made (step 310). These passes are implementation dependent and may involve identification of basic blocks, flow determination, initial register assignment, variable use analysis, etc. While these passes typically would not generate native code, they could produce intermediate code and if so it would be this intermediate code and not the bytecode that is used in the subsequent steps. Such a conversion is compiler dependent and may not occur. The process then performs a range selection process (step 314) with the process then terminating.

Figure 4:
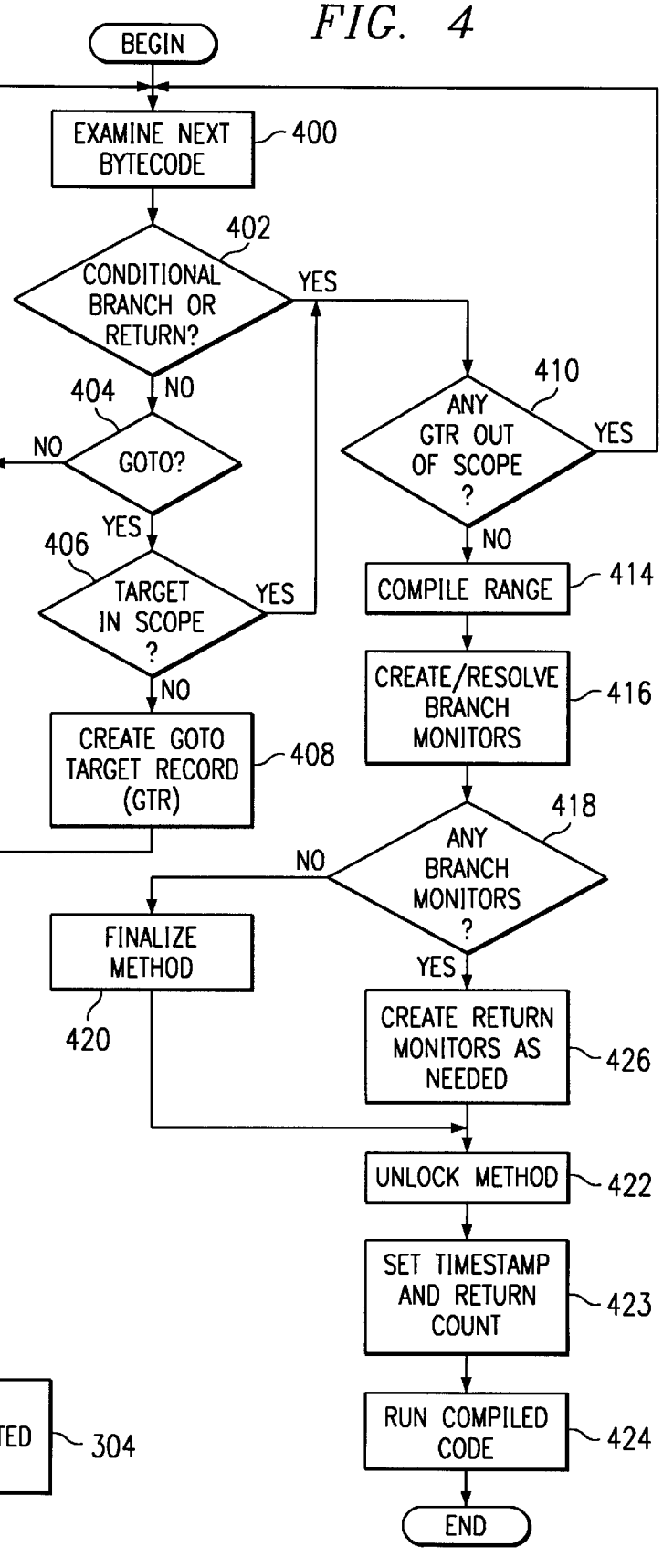
FIG. 4 is a flowchart of a process for range selection depicted in accordance with a preferred embodiment of the present invention.

With reference now to FIG. 4, a flowchart of a process for range selection is depicted in accordance with a preferred embodiment of the present invention. The process illustrated in FIG. 4 is a more detailed description of step 314 in FIG. 3. Range selection takes part of the method and compiles that portion of the method and allows it to execute. The compilation of the bytecode into native code is performed until a conditional branch is encountered.

The process begins by examining the current bytecode in the method (step 400). When compilation begins the current bytecode is the 1st bytecode of the method. When entering via a branch monitor, the current bytecode is the 1st bytecode of the path selected by the conditional flow. A determination is made as to whether the bytecode being examined is a conditional branch or a return bytecode (step 402). If the bytecode is neither, then a determination is made as to whether the bytecode is a goto bytecode (step 404). If the bytecode is not a goto bytecode, the process returns to step 400 to examine the next bytecode.

Otherwise, a determination is made as to whether the target of the goto bytecode is within the scope (step 406). The scope is the range of bytecodes that have been compiled previously or have been selected in the current range. If the target is not within the scope, then a goto target record (GTR) is created (step 408) with the process then returning to step 400. If the target is within the scope, the process proceeds to step 410 as described below.

Returning to step 402, if the bytecode is a conditional flow or return, a determination is made as to whether any GTRs are out of scope for the method (step 410). If any GTRs are out of scope, the process returns to step 400 to examine the next bytecode. This step allows for additional identification of bytecodes to be within the scope in an attempt to include the target as part of the scope. It is possible to include the entire method during this process.

If none of the GTRs are out of scope, then the range of bytecodes selected is compiled (step 414). Branch monitors also are created and resolved (step 416). The branch monitors are in native code and are used in the process of the present invention to initiated additional JITing of the method when they are encountered during execution of the native code for the method. Branch monitors are described in more detail in the description of FIGS. 5 and 6 below. More than one conditional flow bytecode may be present for resolution because of goto bytecodes and making sure that the targets of the goto bytecodes are within the scope of bytecodes to be JITed. It is also possible that the targets of conditional branches have previously been compiled or are part of the current range. In this case, normal branch instructions are generated and branch monitors are not created. Additionally, the new range may include target(s) of previously created branch monitors. In this case the branch monitors are converted to normal branches. The return count is incremented by 5 for each newly created branch monitor.

A determination is then made as to whether any branch monitors are present (step 418). If branch monitors are not present, then the process has finished the compiling of bytecodes for the method, and the method is finalized (step 420). Thereafter, the method is unlocked (step 422), the time stamp is set to the current time plus 20 seconds (step 423) and the compiled code is run (step 424) with the process terminating thereafter.

With reference again to (step 418), if branch monitors are still present, then return monitors are created in the appropriate places (step 426) with the process then proceeding to step 422 as described above. Return monitors are native code and cause additional processes to be executed before the return to the calling method actually occurs. Return monitors are described in more detail in the description of FIG. 7 below.

Figure 5:
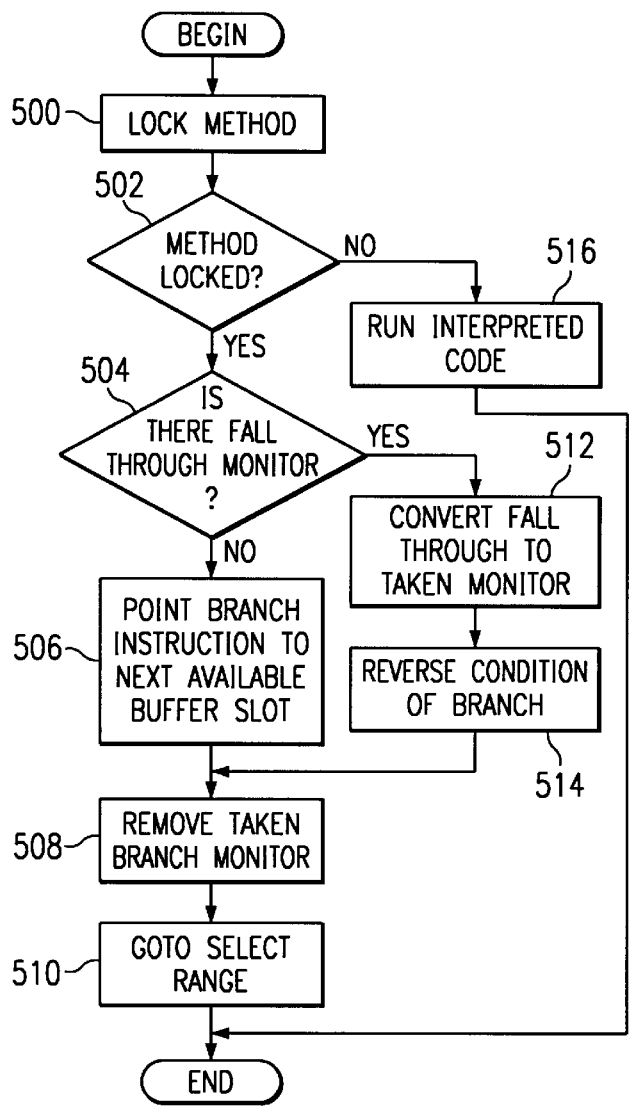
FIG. 5 is a flowchart of the process used by a taken branch monitor depicted in accordance with a preferred embodiment of the present invention.

With reference now to FIG. 5, a flowchart of the process used by a taken branch monitor is depicted in accordance with a preferred embodiment of the present invention.

The process begins by locking the method (step 500). A determination is then made as to whether the attempt to lock method was successful (step 502). If the attempt was successful, a determination is made as to whether a fall through branch monitor is present (step 504). This determination is made to see whether the fall through case has occurred. If a fall through monitor is not present, then the fall through case has occurred and the branch instruction is pointed to the next available buffer slot (step 506). This step is used to provide for a linear management of the buffer or memory in which the native code is placed when produced from JITing of the method. The determination in step 504 is made to identify whether a case is present in which either branch has been taken. When a branch is taken, it is necessary to place the code in a place somewhere in memory. The compiler does not know which path will be taken, but the process knows that if the branch case is taken that is best to place the just compiled code right afterwards rather than placing it in a noncontiguous spot in memory. This provides for I cache efficiency.

Thereafter, the taken branch monitor is removed (step 508) and the process then sets the current bytecode to the 1st bytecode of the taken path (step 509). Finally, control is passed to the perform range selection process (step 510) with the process terminating thereafter. The range selection process step in step 510 is described in more detail in FIG. 4.

With reference again to step 504, if a fall through monitor is present, then the fall through monitor is converted to a taken monitor (step 512). The step removing the taken branch monitor is that of the monitor encountered and initiating the process in FIG. 5 instead of the monitor converted in step 512.

Thereafter, the condition of the branch is reversed (step 514) and the process proceeds to step 508 as described above.

With reference again to step 502, if the attempt to lock the method was unsuccessful, then the interpreted code is run (step 516) with the process then terminating for the taken branch monitor.

Figure 6:
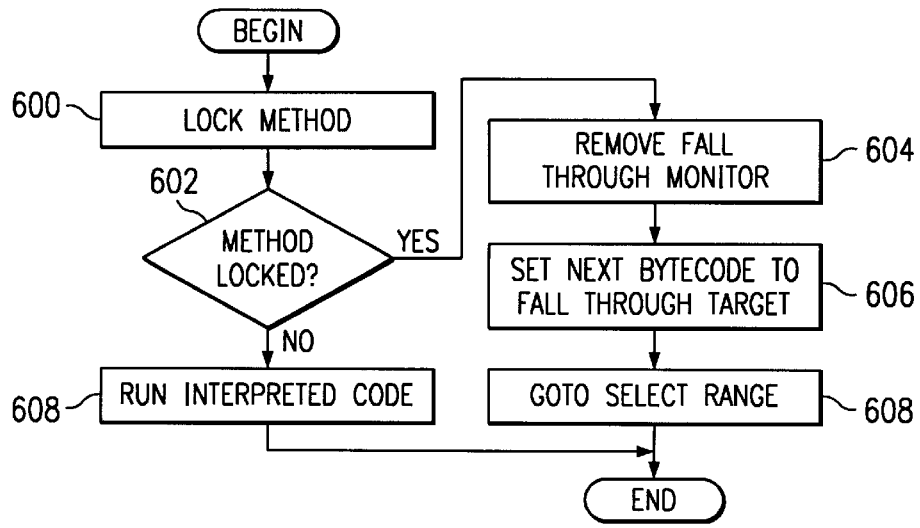
FIG. 6 is a flowchart of the process for a fall through branch monitor depicted in accordance with a preferred embodiment of the present invention.

With reference now to FIG. 6, a flowchart of the process for a fall through branch monitor is depicted in accordance with a preferred embodiment of the present invention. The process in FIG. 6 is triggered when a fall through branch monitor is encountered during execution of the compiled code. The fall through branch monitor is written in native instructions specific to the data processing system on which the instructions are executing. The process begins by attempting to lock the method (step 600). Thereafter, a determination is made as to whether the method has been locked (step 602). If the method has been locked, the fall through monitor is removed (step 604). The next bytecode is set to the fall through target (step 606) with the process then proceeding to the range selection process in FIG. 4 (step 608) with the process terminating thereafter.

With reference again to step 602, if the attempt to lock the method has been unsuccessful, then the interpreted code is run (step 608) with the process terminating thereafter.

Figure 7:
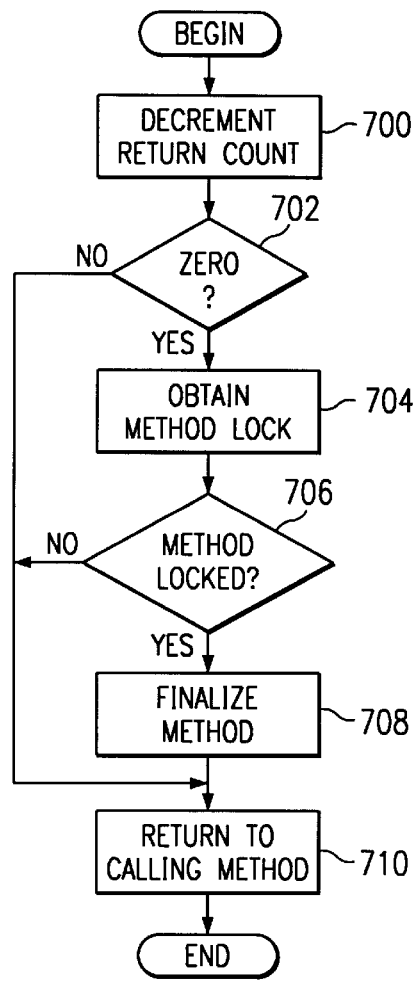
FIG. 7 is a flowchart of a return monitor depicted in accordance with a preferred embodiment of the present invention.

With reference now to FIG. 7, a flowchart of a return monitor is depicted in accordance with a preferred embodiment of the present invention. The process begins by decrementing the return count (step 700). Thereafter, a determination is made as to whether the return count is equal to zero (step 702). If the return count is equal to zero an attempt is made to obtain a lock for the method (step 704). A determination is then made as to whether the method has been locked (step 706). If the method has been locked, the method is then finalized (step 708). Thereafter, the process returns to the calling method (step 710) with the process terminating thereafter.

With reference again to step 706, if the attempt to lock the method was unsuccessful, the process proceeds to step 710 as described above. Further, if the return count is not equal to zero in step 702, the process also proceeds to step 710.

For methods with exception tables, it may be desirable to JIT entire try and catch blocks to avoid exception table explosion.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer in which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process for just in time compiling a method including a set of bytecodes, the process comprising the computer implemented steps of:

responsive to encountering bytecodes within the set of bytecodes that have not been compiled, determining whether the method should be finalized;

responsive to an absence of a determination that the method should be finalized, compiling the bytecodes in the method up to a conditional flow bytecode within the plurality of bytecodes to create complied instructions; and executing the compiled instructions.

2. The process of claim 1 further comprising:

locking the method prior to compiling the bytecodes.

3. The process of claim 1, wherein the plurality of bytecodes have an order of execution and wherein the compiling step comprises:

examining bytecodes within the set of bytecodes in the order of execution to form examined bytecodes;

responsive to examining a conditional flow bytecode within the plurality of bytecodes, compiling the examined bytecodes; and responsive to examining a conditional flow bytecode, creating branch monitors for the conditional flow bytecode.

4. The process of claim 3, wherein the step of creating branch monitors for the conditional flow bytecode comprises:

inserting a fall through branch monitor and a taken branch monitor into the method, wherein the fall through branch monitor and the taken branch monitor are in native code specific to the computer.

5. The process of claim 3 further comprising:

responsive to encountering a taken branch monitor during execution of the compiled instruction, determining whether a taken branch monitor and a fall through monitor are present in association with the conditional flow bytecode; and responsive to a determination that a taken branch monitor and a fall through branch monitor are present, converting the fall though branch monitor to a new branch taken monitor, reversing the condition of the new branch taken monitor, removing the branch monitor; and repeating the examining, compiling, and creating steps;

responsive to determining a fall through branch monitor is absent, removing the taken branch monitor; and repeating the examining, compiling, and creating steps.

6. The process for 3 further comprising:

examining bytecodes within the set of bytecodes in the order of execution to form examined bytecodes;

responsive to examining a return bytecode, inserting a return monitor in place of the return bytecode.

7. The process of claim 6 further comprising:

responsive to encountering a return monitor during execution of the compiled instructions, determining whether a selected number of returns has occurred; and responsive to determining that a selected number of returns has occurred, finalizing the method.

8. The process of claim 7, wherein the method was called by a calling method and further comprising:

responsive to an absence of a determination that a selected number of returns has occurred, returning to the calling method.

9. The process of claim 1, wherein the determining, compiling, and executing steps are performed by a just in time compiler.

10. The process of claim 1, wherein the bytecodes are Java bytecodes.

11. The process of claim 1 further comprising:
responsive to a determination that the method is to be finalized, finalizing the method.

12. A process for processing a set of instructions non specific to a data processing system and having an order of execution, the process comprising the data processing system implemented steps of:
examining instructions within the set of instructions in the order of execution to create a range of identified instructions;
responsive to encountering a conditional flow instruction while examining the set of instructions, compiling the range of instructions to form a partially compiled set of instructions specific to the data processing system; and
responsive to encountering a conditional flow instruction, selectively inserting branch monitors to handle a taken branch and a fall through branch for the conditional flow instruction; and
executing the partially compiled set of instructions.

13. The process of claim 12, wherein the step of compiling comprises:
determining whether a goto instruction with an uncompiled target or a goto instruction with a target outside of the range of instructions is present in the range of instructions; and
responsive to a positive determination, returning to the examining step.

14. The process of claim 12, wherein the set of instructions is a set of bytecodes.

15. The process of claim 14, wherein the set of bytecodes form a method.

16. The process of claim 14, wherein the bytecodes are Java bytecodes.

17. The process of claim 12 further comprising:
responsive to encountering a branch monitor during execution of the partially compiled set of instructions, initiating the examining step.

18. A process for just in time compiling a method including a plurality of bytecodes, the process comprising the computer implemented steps of:
responsive to a determination that a method should be just in time compiled, compiling the method up to a conditional flow bytecode within the method to create a partially compiled method;
executing the partially compiled method; and
responsive to a determination to an end of the partially compiled method, indicating that compilation of the method has concluded.

19. A data processing system for just in time compiling a method including a set of bytecodes, the data processing system comprising:
determination means, responsive to encountering bytecodes within the set of bytecodes that have not been compiled, for determining whether the method should be finalized;
compiling means, responsive to an absence of a determination that the method should be finalized, for compiling the bytecodes in the method up to a conditional flow bytecode within the plurality of bytecodes to create complied instructions; and
executing means for executing the compiled instructions.

20. The data processing system of claim 19 further comprising:
locking means for locking the method prior to compiling the bytecodes.

21. The data processing system of claim 19, wherein the plurality of bytecodes have an order of execution and wherein the compiling means comprises:
examining means for examining bytecodes within the set of bytecodes in the order of execution to form examined bytecodes;
compiling means, responsive to examining a conditional flow bytecode within the plurality of bytecodes, for compiling the examined bytecodes; and
creating means, responsive to examining a conditional flow bytecode, for creating branch monitors for the conditional flow bytecode.

22. The data processing system of claim 21, wherein creating branch monitors for the conditional flow bytecode comprises:
inserting means for inserting a fall through branch monitor and a taken branch monitor into the method, wherein the fall through branch monitor and the taken branch monitor are in native code specific to the computer.

23. The data processing system of claim 21 further comprising:
determination means, responsive to encountering a taken branch monitor during execution of the compiled instruction, for determining whether a taken branch monitor and a fall through monitor are present in association with the conditional flow bytecode;
converting means, responsive to a determination that a taken branch monitor and a fall through branch monitor are present, for converting the fall though branch monitor to a new branch taken monitor, reversing the condition of the new branch taken monitor, removing the branch monitor; and
repeating means for repeating the initiation of the examining means, compiling means, and the creating means; and
removing means, responsive to determining a fall through branch monitor is absent, for removing the taken branch monitor; and repeating the examining, compiling, and creating steps.

24. The data processing system for 21 further comprising:
examining means for examining bytecodes within the set of bytecodes in the order of execution to form examined bytecodes; and
inserting means, responsive to examining a return bytecode, for inserting a return monitor in place of the return bytecode.

25. The data processing system of claim 24 further comprising:
determination means, responsive to encountering a return monitor during execution of the compiled instructions, for determining whether a selected number of returns has occurred; and
finalizing means, responsive to determining that a selected number of returns has occurred, for finalizing the method.

26. The data processing system of claim 25, wherein the method was called by a calling method and further comprising:
returning means, responsive to an absence of a determination that a selected number of returns has occurred, for returning to the calling method.

27. The data processing system of claim 19, wherein the determining means, compiling means, and executing means are performed by a just in time compiler.

28. The data processing system of claim 19, wherein the bytecodes are Java bytecodes.

29. The data processing system of claim 19 further comprising:

finalizing means, responsive to a determination that the process is to be finalized, for finalizing the process.

30. A data processing system for processing a set of instructions non specific to a data processing system and having an order of execution, the data processing system comprising:

examining means for examining instructions within the set of instructions in the order of execution to create a range of identified instructions, compiling means, responsive to encountering a conditional flow bytecode while examining the set of instructions, for compiling the range of instructions to form a partially compiled set of instructions specific to the data processing system; and selective means, responsive to encountering a conditional flow instruction, for selectively inserting branch monitors to handle a taken branch and a fall through branch for the conditional flow instruction; and executing means for executing the partially compiled set of instructions.

31. The data processing system of claim 30, wherein the compiling means comprises:

determination means for determining whether a goto instruction with an uncompiled target or a goto instruction with a target outside of the range of instructions is present in the range of instructions;

returning means, responsive to a positive determination, for reinitiating execution of the examining means.

32. The data processing system of claim 30, wherein the set of instructions is a set of bytecodes.

33. The data processing system of claim 32, wherein the set of bytecodes form a method.

34. The data processing system of claim 32, wherein the bytecodes are Java bytecodes.

35. The data processing system of claim 30 further comprising:

initiating means, responsive to encountering a branch monitor during execution of the partially compiled set of instructions, for initiating the examining means.

36. A data processing system for just in time compiling a method including a plurality of bytecodes, the data processing system comprising:

compiling means, responsive to a determination that a method should be just in time compiled, for compiling the method up to a conditional flow bytecode within the method to create a partially compiled method;

executing means for executing the partially compiled method; and indicating means, responsive to a determination to an end of the partially compiled method, for indicating that compilation of the method has concluded.

37. A computer program product in a computer readable medium for just in time compiling a method including a set of bytecodes, the computer program product comprising:

first instructions, responsive to encountering bytecodes within the set of bytecodes that have not been compiled, for determining whether the method should be finalized;

second instructions, responsive to an absence of a determination that the method should be finalized, for compiling the bytecodes in the method up to a conditional flow bytecode within the plurality of bytecodes to create complied instructions; and third instructions for executing the compiled instructions.

38. A computer program product in a computer readable medium for processing a set of instructions non specific to a data processing system and having an order of execution, the computer program product comprising:

first instructions for examining instructions within the set of instructions in the order of execution to create a range of identified instructions, second instructions, responsive to encountering a conditional flow bytecode while examining the set of instructions, for compiling the range of instructions to form a partially compiled set of instructions specific to the data processing system; and third instructions, responsive to encountering a conditional flow instruction, for selectively inserting branch monitors to handle a taken branch and a fall through branch for the conditional flow instruction; and fourth instructions for executing the partially compiled set of instructions.

39. A computer program product in a computer readable medium for just in time compiling a method including a plurality of bytecodes, the computer program product comprising:

first instructions, responsive to a determination that a method should be just in time compiled, for compiling the method up to a conditional flow bytecode within the method to create a partially compiled method;

second instructions for executing the partially compiled method; and third instructions, responsive to a determination to an end of the partially compiled method, for indicating that compilation of the method has concluded.

* * * * *

UNITED STATES PATENT AND TRADEMARK OFFICE
CERTIFICATE OF CORRECTION

PATENT NO.    : 6,295,642 B1
DATED         : September 25, 2001
INVENTOR(S)   : Blandy It is certified that error appears in the above-identified patent and that said Letters Patent is hereby corrected as shown below:

Column 10,
Line 11, "complied" should be -- compiled --.
Line 42, "though" should be -- through --.

Column 11,
Line 65, "complied" should be -- compiled --.

Column 12,
Line 30, after "fall through", insert -- branch --.
Line 34, "though" should be -- through --.

Column 14,
Line 17, "complied" should be -- compiled --.

Signed and Sealed this

Fifth Day of November, 2002

*Attest:*

JAMES E. ROGAN
*Director of the United States Patent and Trademark Office*

*Attesting Officer*